(12) United States Patent
Harisi et al.

(10) Patent No.: US 12,164,156 B2
(45) Date of Patent: Dec. 10, 2024

(54) LATCH FOR TELECOMMUNICATIONS MODULE

(71) Applicant: The Siemon Company, Watertown, CT (US)

(72) Inventors: Martin Harisi, Wolcott, CT (US); Maxwell Yip, Trumbull, CT (US)

(73) Assignee: THE SIEMON COMPANY, Watertown, CT (US)

( * ) Notice: Subject to any disclaimer, the term of this patent is extended or adjusted under 35 U.S.C. 154(b) by 204 days.

(21) Appl. No.: 17/622,422

(22) PCT Filed: Jun. 18, 2020

(86) PCT No.: PCT/US2020/038449
§ 371 (c)(1),
(2) Date: Dec. 23, 2021

(87) PCT Pub. No.: WO2020/263678
PCT Pub. Date: Dec. 30, 2020

(65) Prior Publication Data
US 2022/0350088 A1 Nov. 3, 2022

Related U.S. Application Data

(60) Provisional application No. 62/866,116, filed on Jun. 25, 2019.

(51) Int. Cl.
*G02B 6/00* (2006.01)
*G02B 6/38* (2006.01)
*G02B 6/40* (2006.01)
*G02B 6/44* (2006.01)

(52) U.S. Cl.
CPC ........... *G02B 6/3897* (2013.01); *G02B 6/406* (2013.01); *G02B 6/4452* (2013.01)

(58) Field of Classification Search
CPC ........ G02B 6/3897; G02B 6/00; G02B 6/406; G02B 6/4452
See application file for complete search history.

(56) References Cited

U.S. PATENT DOCUMENTS

| 3,989,343 A | 11/1976 | Lucius et al. |
| 4,541,036 A | 9/1985 | Landries et al. |
| 5,119,459 A | 6/1992 | Meyerhoefer et al. |
| 5,238,427 A | 8/1993 | Fry et al. |

(Continued)

FOREIGN PATENT DOCUMENTS

| CN | 105703175 A | 6/2016 |
| EP | 1377862 A1 | 1/2004 |
| EP | 2876744 A1 | 5/2015 |

OTHER PUBLICATIONS

International Search Report for Application No. PCT/US2020/038449; Issued Sep. 4, 2020; 4 Pages.

(Continued)

*Primary Examiner* — Jennifer Doan
(74) *Attorney, Agent, or Firm* — CANTOR COLBURN LLP (57) ABSTRACT

A latch configured to secure a module to a panel. The latch includes an outer latch and an inner latch configured to move independently of the outer latch. The outer latch and the inner latch are configured to provide at least two latching points between the latch and the panel.

15 Claims, 8 Drawing Sheets

(56) References Cited

U.S. PATENT DOCUMENTS

| | | |
|---|---|---|
| 5,247,603 A | 9/1993 | Vidacovich et al. |
| 5,689,605 A | 11/1997 | Cobb et al. |
| 5,871,370 A | 2/1999 | Kameyama et al. |
| 6,629,858 B2 | 10/2003 | Lo et al. |
| 7,077,686 B2 | 7/2006 | Seo et al. |
| 7,340,145 B2 | 3/2008 | Allen |
| 7,822,310 B2 | 10/2010 | Castonguay et al. |
| 8,506,172 B2 | 8/2013 | Meadowcroft et al. |
| 8,781,284 B2 | 7/2014 | Bragg |
| 8,929,708 B2 | 1/2015 | Pimentel et al. |
| 8,995,136 B2 * | 3/2015 | Kostecka ............ H05K 7/1489 361/679.37 |
| 9,372,318 B2 | 6/2016 | Veatch et al. |
| 9,599,785 B2 | 3/2017 | Xu et al. |
| 9,864,158 B2 | 1/2018 | Wiltjer et al. |
| 9,910,236 B2 | 3/2018 | Cooke et al. |
| 10,222,570 B2 | 3/2019 | Cooke et al. |
| 10,371,913 B2 | 8/2019 | Claessens et al. |
| 10,520,690 B2 | 12/2019 | Takano et al. |
| 10,670,822 B2 | 6/2020 | Vogel |
| 10,677,996 B2 | 6/2020 | Aoshima et al. |
| 2001/0012722 A1 | 8/2001 | Adams |
| 2004/0014367 A1 | 1/2004 | Petersen |
| 2004/0043654 A1 | 3/2004 | Lee et al. |
| 2008/0188113 A1 | 8/2008 | Byrne |
| 2010/0227500 A1 | 9/2010 | Shih |
| 2012/0321267 A1 * | 12/2012 | Coburn ............... G02B 6/4453 385/135 |
| 2013/0056263 A1 | 3/2013 | Chavan et al. |
| 2017/0299821 A1 | 10/2017 | Weilland et al. |
| 2018/0156988 A1 | 6/2018 | Gniadek et al. |

OTHER PUBLICATIONS

Written Opinion for Application No. PCT/US2020/038449; Issued Sep. 4, 2020; 5 Pages.

Chinese Office Action for Application No. 202080035629.3, Issued May 31, 2024, 9 Pages.

* cited by examiner

LATCH FOR TELECOMMUNICATIONS MODULE

CROSS-REFERENCE TO RELATED APPLICATIONS

This application is a 371 U.S. National Stage application of PCT/US2020/038449, filed Jun. 18, 2020, which claims the benefit of U.S. Provisional Application No. 62/866,116, filed Jun. 25, 2019, both of which are incorporated by reference in their entirety herein.

TECHNICAL FIELD

The subject matter disclosed herein relates generally to telecommunications modules, and more particularly, to a latch for use with a telecommunications module.

BACKGROUND

Telecommunications systems often employ rack-mounted enclosures that provide an interconnection point for various cables (e.g., copper, fiber, coaxial cables, etc.). The enclosures may support one or modules, with each module supporting a plurality of telecommunications connectors (e.g., outlets, adapters, etc.). Existing enclosures may employ rail systems for mounting the modules. The rail systems can be overly complex and costly.

SUMMARY

According to an embodiment, a latch configured to secure a module to a panel includes an outer latch; and an inner latch configured to move independently of the outer latch; wherein the outer latch and the inner latch are configured to provide at least two latching points between the latch and the panel.

In addition to one or more of the features described, herein, or as an alternative, further embodiments may include wherein the outer latch and the inner latch are configured to provide at least three latching points between the latch and the panel.

In addition to one or more of the features described herein, or as an alternative, further embodiments may include wherein the outer latch is configured to provide two latching points between the latch and the panel and the inner latch is configured to provide one latching point between the latch and the panel.

In addition to one or more of the features described herein, or as an alternative, further embodiments may include wherein the outer latch is configured to be deflected in a direction towards and away from the module.

In addition to one or more of the features described herein, or as an alternative, further embodiments may include wherein the inner latch is configured to be deflected in a direction towards and away from the module.

In addition to one or more of the features described herein, or as an alternative, further embodiments may include wherein the outer latch includes an outer press area at a distal end of the outer latch and the inner latch includes an inner press area at a distal end of the inner latch.

In addition to one or more of the features described herein, or as an alternative, further embodiments may include wherein the inner press area is located within the outer press area.

In addition to one or more of the features described herein, or as an alternative, further embodiments may include wherein the outer latch includes a base, the outer latch including an outer latch arm extending from the base to an outer latch distal end, the outer latch arm including a notch to provide one of the at least two latching points between the latch and the panel.

In addition to one or more of the features described herein, or as an alternative, further embodiments may include wherein the outer latch arm has a first tapered surface from the base to the notch such that the thickness of the outer latch arm increases from the base to the notch.

In addition to one or more of the features described herein, or as an alternative, further embodiments may wherein the outer latch arm has a second tapered surface from the notch to the outer latch distal end such that the thickness of the first outer latch arm decreases from the notch to the outer latch distal end.

In addition to one or more of the features described herein, or as an alternative, further embodiments may include wherein the inner latch is joined to the module at the base, the inner latch including an inner latch arm extending from the base to an inner latch arm distal end.

In addition to one or more of the features described herein, or as an alternative, further embodiments may include wherein the inner latch arm has a third tapered surface from the base to the inner latch arm distal end such that the thickness of the inner latch arm increases from the base to the inner latch arm distal end.

In addition to one or more of the features described herein, or as an alternative, further embodiments may include wherein the inner latch includes a central arm, the central arm including a second notch to provide one of the at least two latching points between the latch and the panel.

In addition to one or more of the features described, herein, or as an alternative, further embodiments may include wherein the central arm includes a fourth tapered surface on a first side of the second notch and a fifth tapered surface on a second side of the second notch.

In addition to one or more of the features described herein, or as an alternative, further embodiments may include a tether, the tether including a head positioned to travel over an outer latch deflection surface and an inner latch deflection surface.

In addition to one or more of the features described herein, or as an alternative, further embodiments may include wherein when the outer latch deflection surface and the inner latch deflection surface are configured such that the head deflects the inner latch and the outer latch towards the module.

According to another embodiment, a module includes a mounting location configured to receive one or more telecommunications connectors; and a latch configured to secure the module to a panel, the latch including an outer latch; an inner latch configured to move independently of the outer latch; wherein the outer latch and the inner latch are configured to provide at least two latching points between the latch and the panel.

Technical effects of embodiments of the present disclosure include providing a latch suitable to mount a module to a panel from the front or rear and remove the module from the panel from either the front or rear.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Referring now to the drawings wherein e elements are numbered alike in the FIGURES.

DETAILED DESCRIPTION

Figure 1:
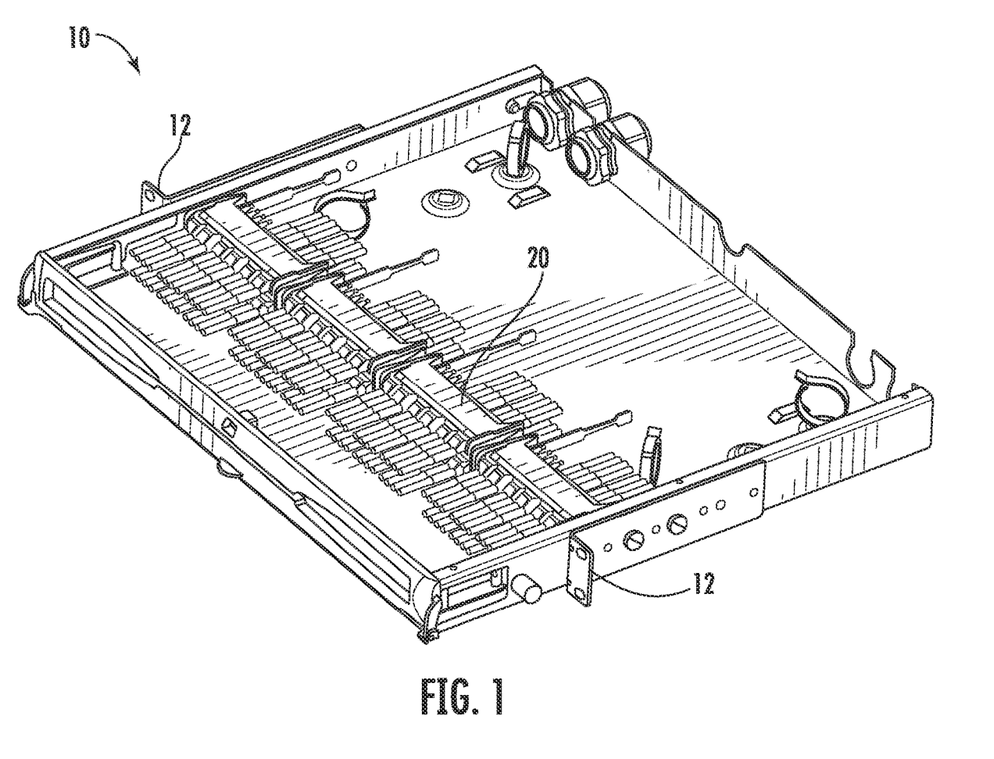
FIG. 1 is perspective view of an enclosure in an example embodiment.

FIG. 1 is perspective view of an enclosure 10 in an example embodiment. The enclosure 10 is generally rectangular, having four side walls, a bottom, a rear and a front door that can be opened and closed. A top (not shown) may also be part of the enclosure 10. The enclosure 10 is designed for mounting to a rack via mounting tabs 12, as known in the art. The enclosure 10 is sized to take up 1U space rack, but may be sized to take up more rack space, Mounted in the enclosure 10 are one or more modules 20. Each module 20 provides a mounting location configured to receive one or more telecommunications connectors, as described further herein.

Figure 2:
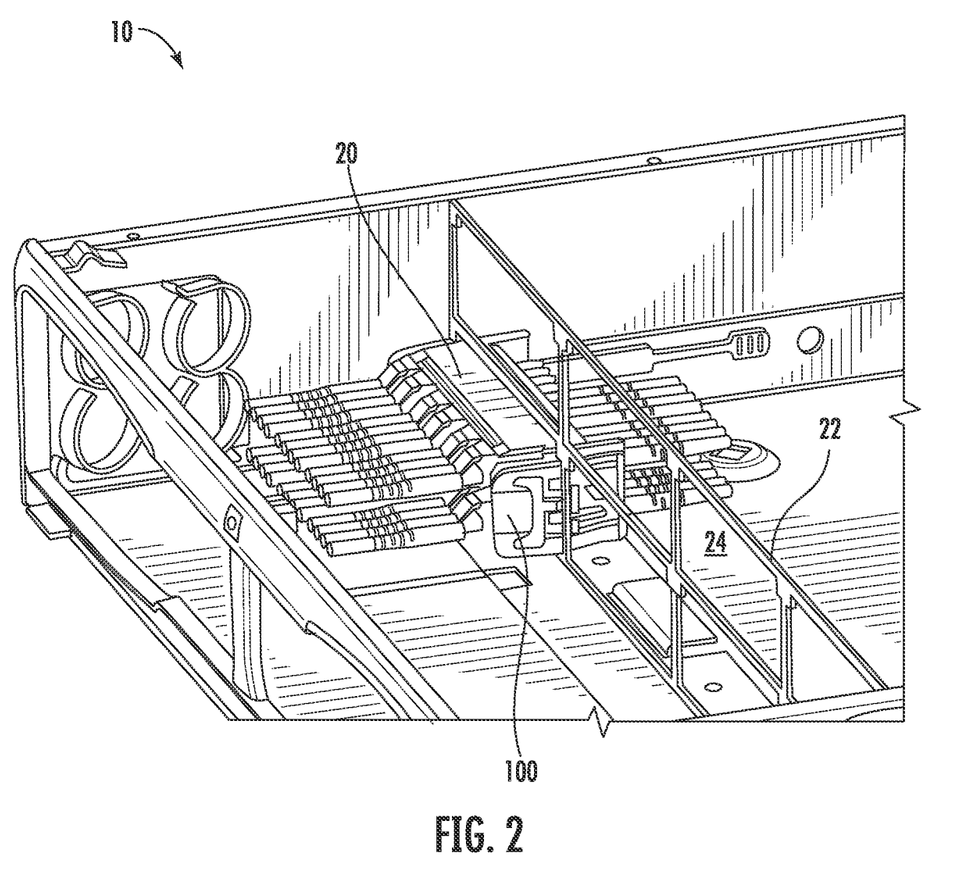
FIG. 2 is an enlarged view of a portion of the enclosure in an example embodiment.

FIG. 2 is an enlarged, view of a portion of the enclosure 10 in an example embodiment. As shown in FIG. 2, modules 20 are mounted in a panel 22 within the enclosure 10. The panel 22 in FIG. 2 is parallel to the front door of the enclosure 10. In other embodiments, the panel 22 may be non-parallel to the front door of the enclosure 10 or may include a plurality of sections at different angles with respect to the front door of the enclosure 10. The panel 22 includes one or more openings 24 sized to receive a module 20. A latch 100 is disposed on each end of the module 20 to secure the module 20 to the panel 22.

Figure 3:
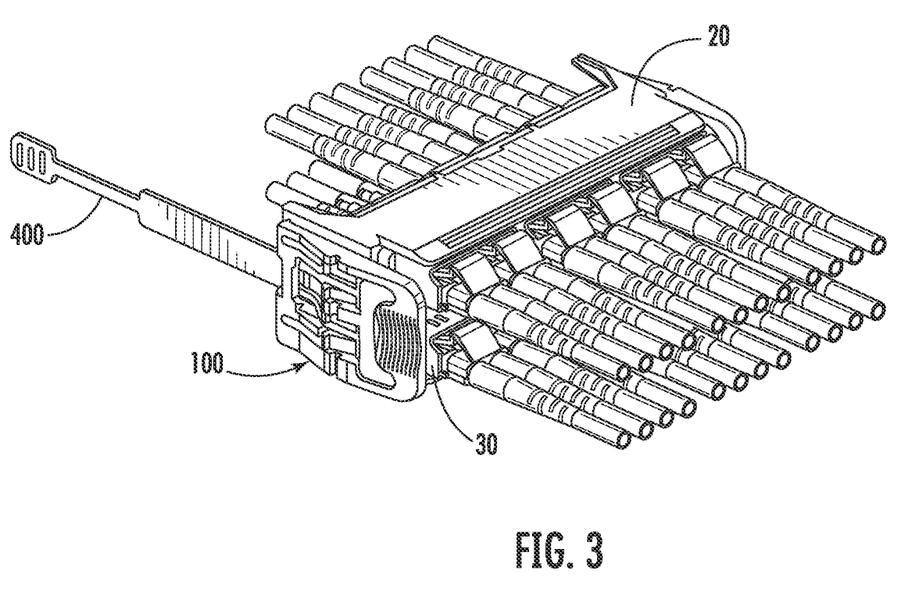
FIG. 3 is a perspective view of a module having telecommunications connectors mounted therein in an example embodiment.

FIG. 3 is a perspective view of a module 20 having telecommunications connectors 30 mounted therein in an example embodiment. The telecommunications connectors 30 may have a variety of formats, such as outlets, adapters, couplers, splices, etc. The telecommunications connectors 30 mate with respective telecommunications connectors, such as plugs. The cabling joined at the telecommunications connectors 30 may include one or more of optical fiber, copper, co-ax, etc. The latch 100 includes a tether 400 that allows the latch 100 to be defeated from the rear of the enclosure 10, as described in further detail herein.

Figure 4:
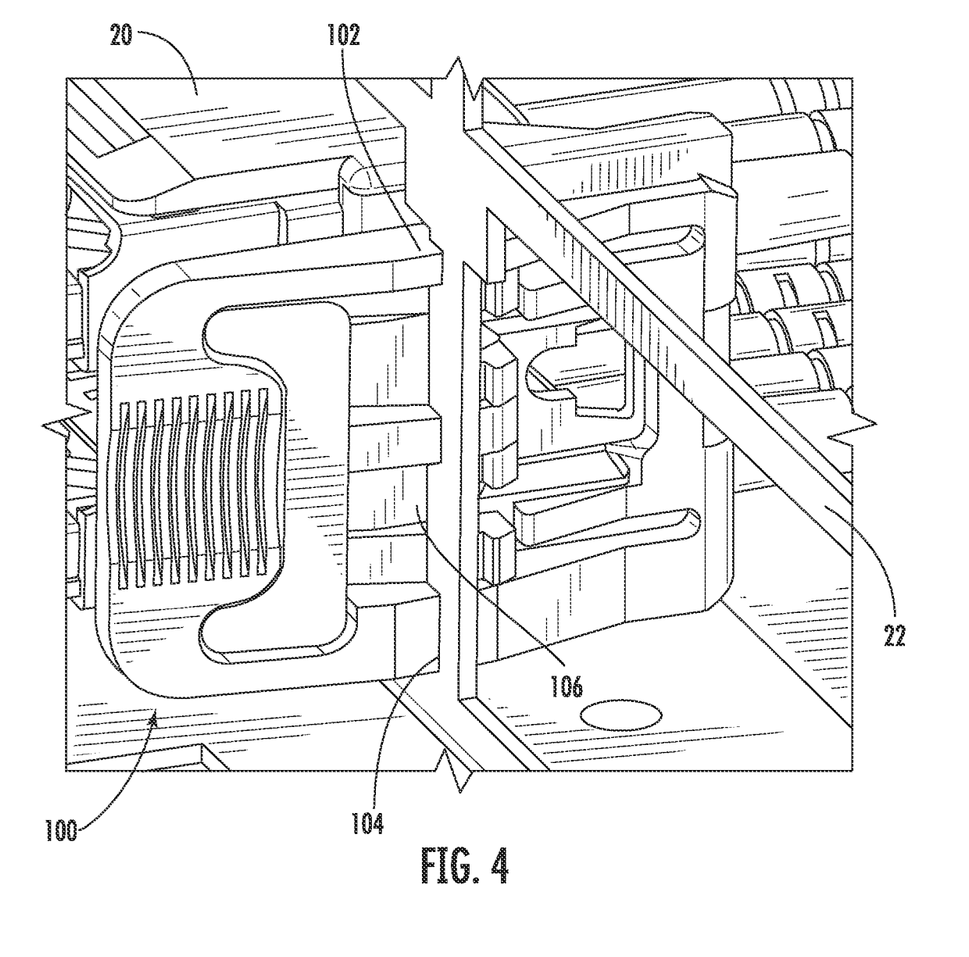
FIG. 4 depicts a latch of the module secured to a panel in an example embodiment.

FIG. 4 depicts the latch 100 of the module 20 secured to a panel 22 in an example embodiment. In the embodiment of FIG. 4, the latch 100 provides three latching points 102, 104 and 106 to secure the module 20 to the panel 22. The latch 100 may be configured to provide at least two latching points.

Figure 5:
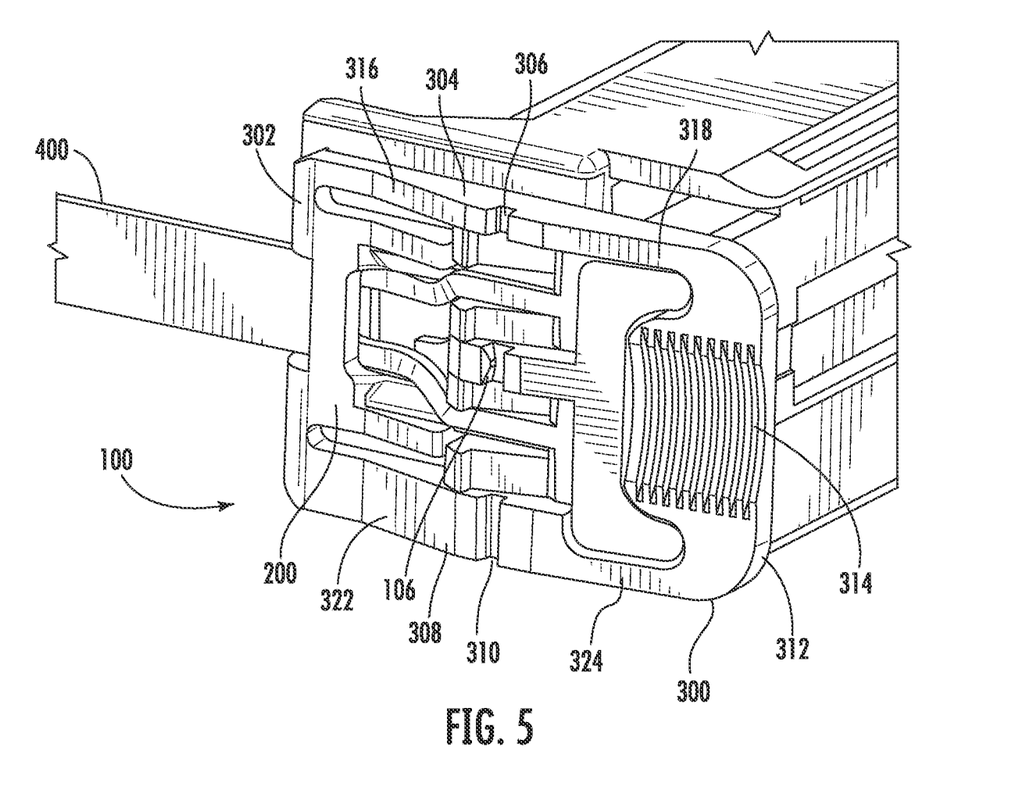
FIG. 5 depicts the latch for securing the module to the panel in an example embodiment.

FIG. 5 depicts the latch 100 for securing the module 20 to the panel 22 in an example embodiment. Latch 100 includes an inner latch 200 and an outer latch 300. The inner latch 200 and the outer latch 300 can move relative to each other to enable insertion and removal of the module 20 to/from the panel 22. Both the inner latch 200 and the outer latch 300 may be deflected in a direction towards and away from the module 20. The outer latch 300 is secured to the module 20 at a base 302. A first outer latch arm 304 includes a first notch 306 that provides the first latching point 102. The first notch 306 receives an edge of the panel 22. A second outer latch arm 308 includes a second notch 310 that provides the second latching point 104. The second notch 310 receives an edge of the panel 22. A distal end 312 of the outer latch 300 includes an outer press area 314. Applying pressure to the outer press area 314 deflects the outer latch 300 towards the module 20.

The first outer latch arm 304 has a tapered surface from the base 302 to the first notch 306 such that the thickness of the first outer latch arm 304 increases from the base 302 to the first notch 306, The first outer latch arm 304 has a tapered surface 316 from the base 302 to the first notch 306 such that the thickness of the first outer latch arm 304 increases from the base 302 to the first notch 306; the tapered surface 316 extends away from the module 20. The first outer latch arm 304 has a tapered surface 318 from the first notch 306 to the distal end 312 such that the thickness of the first outer latch arm 304 decreases from the first notch 306 to the distal end 312; the tapered surface 318 extends towards the module 20. The second outer latch arm 308 has a tapered surface 322 from the base 302 to the second notch 310 such that the thickness of the second outer latch arm 308 increases from the base 302 to the second notch 310; the tapered surface 322 extends away from the module 20. The second outer latch arm 308 has a tapered surface 324 from the second notch 310 to the distal end 312 such that the thickness of the second outer latch arm 308 decreases from the second notch 310 to the distal end 312; the tapered surface 324 extends towards the module 20.

Figure 6:
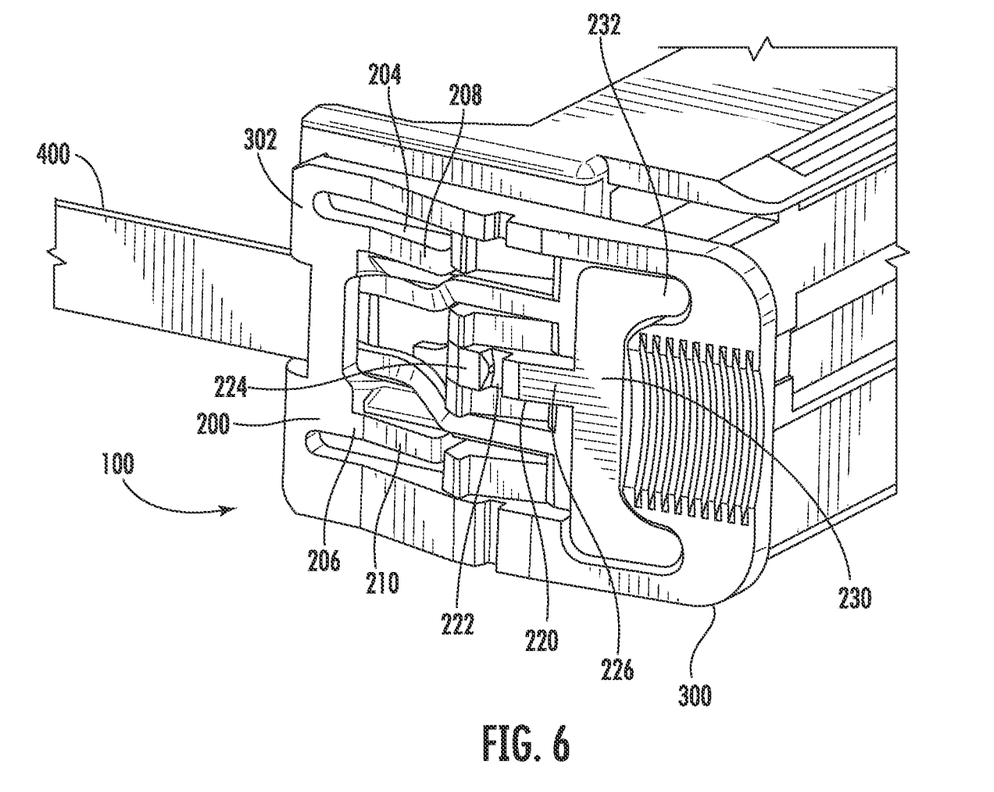
FIG. 6 depicts the latch for securing the module to the panel in an example embodiment.

FIG. 6 depicts the latch 100 for securing the module 20 to the panel 22 in an example embodiment. The inner latch 200 has a first end that joins the base 302 of the outer latch 300, In effect, base 302 serves as an anchor point for the cantilevered inner latch 200 and outer latch 300. The inner latch 200 includes a first inner latch arm 204 and a second inner latch arm 206. The first inner latch arm 204 has a tapered surface 208 from the base 302 to a distal end of the first inner latch arm 204 such that the thickness of the first inner latch arm 204 increases from the base 302 to the distal end of the first inner latch arm 204; the tapered surface 208 extends away from the module 20. The second inner latch arm 206 has a tapered surface 210 from the base 302 to a distal end of the second inner latch arm 206 such that the thickness of the second inner latch arm 206 increases from the base 302 to the distal end of the second inner latch arm 206; the tapered surface 210 extends away from the module 20.

The inter latch also includes a central arm 220, which is joined to the first inner latch arm 204 and the second inner latch arm 206. The central arm 220 includes a third notch 222 that serves as a third latching paint 106. The third notch 222 receives an edge of the panel 22. The central arm 220 includes tapered surfaces 224 and 226 on either side of the notch 222. Tapered surfaces 224 and 226 extend away from the module as they approach the third notch 222. A distal end 230 of the inner latch 200 includes an inner press area 232. Applying pressure to the inner press area 232 deflects the inner latch 200 towards the module 20.

Figure 7:
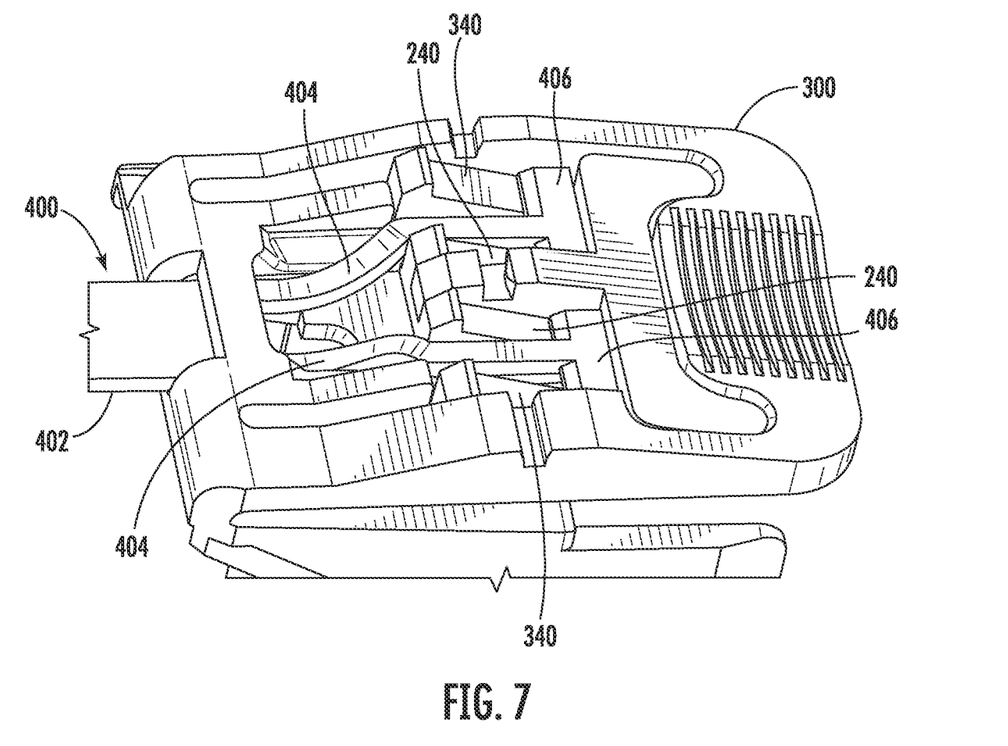
FIG. 7 depicts the latch for securing the module to the panel in an example embodiment.

FIG. 7 depicts the latch 100 for securing a module 20 to the panel 22 in an example embodiment. As shown in FIG. 7, the tether 400 includes a pull strap 402. A pair of arms 404 extend from the pull strap 402 and pass on either side of the central arm 220 on the inner latch 200. The arms 404 terminate at at least one head 406 on either side of the central arm 220 and within an interior of the outer latch 300.

The heads 406 of the tether 400 travel over deflection surfaces of the inner latch 200 and the outer latch 300, when the pull strap 402 is pulled backwards so that the heads 406 travel towards base 302. Outer latch 300 includes at least one outer latch deflection surface 340. Inner latch 200 includes at least one inner latch deflection surface 240. When the tether 400 is pulled backwards, tether head(s) 406 travel over outer latch deflection surface(s) 340 and inner latch deflection surface(s) 240. This causes the outer latch 300 and inner latch 200 to deflect towards the module 20, releasing the latch 100 from the panel at the latching points 102, 104 and 106.

Figure 8:
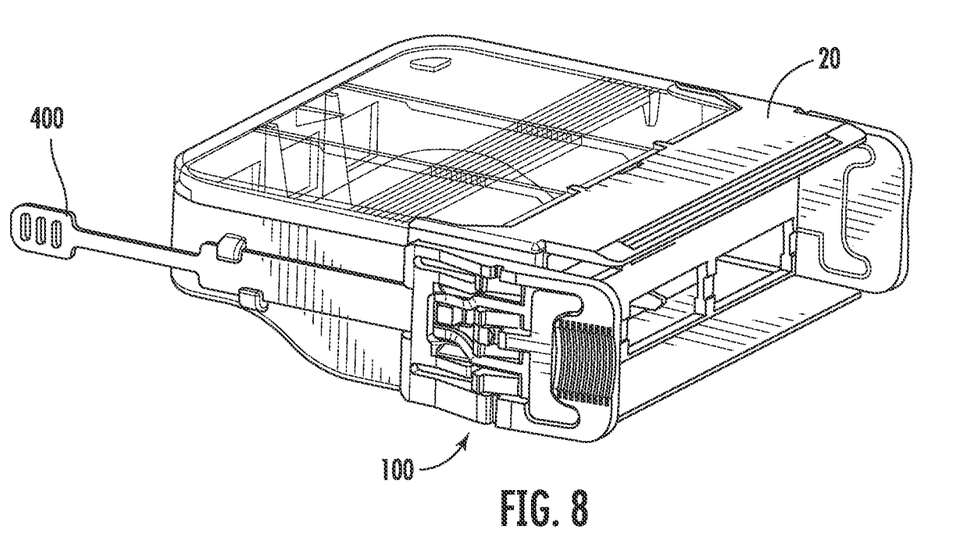
FIG. 8 depicts a module including the latch for securing the module to the panel in an example embodiment.

FIG. 8 depicts a module 20 including the latch 100 for securing the module to the panel 22 in an example embodiment. A latch 100 is positioned on each end of the module 20. In usage, the module 20 may be installed into the panel 22 from either the front or the back of the panel 22. To install the module 20 from the front of the panel, the user can grip the outer press area 314 of the outer latches 300 and push the module 20 into an opening 24 in the panel 22. The panel edges ride on the tapered surfaces 208 and 210 to deflect the inner latch 200 until the panel edge is received in the third notch 222. Once the outer press area 314 is released the panel edge engages first notch 306 and second notch 310.

To install the module 20 from the rear of the panel, the user can grip a rear of the module and push the module 20 into an opening 24 in the panel 22. The panel edges ride on the tapered surfaces 318 and 324 of the outer latch 300 and tapered surface 226 of the central arm 220 of the inner latch 200. This deflects the inner latch 200 and the outer latch 300 until the panel edge is received in the first notch 306, the second notch 310 and the third notch 222.

To remove the module 20 from the front of the panel 22, a user depresses both the outer press area 314 of the outer latch 300 and the inner press area 232 of the inner latch 200 and pulls the module 20 forward. To remove the module 20 from the rear of the panel 22, a user putts the tether 400 associated with each latch 100 of the module 20. This directs both the inner latch 200 and the outer latch 300 towards the module 20, to release the panel edge from the first notch 306, the second notch 310 and the third notch 222 and allow removal of the module 20 from the rear of the panel 22.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described wilt be apparent to those of ordinary skill in the art without departing from the scope and spirit of the invention. Additionally, while the various embodiments of the invention have been described, it is to be understood that aspects of the invention may include only sortie of the described embodiments. Accordingly, the invention is not to be seen as being limited by the foregoing description.

What is claimed is:

1. A latch configured to secure a module to a panel, the latch comprising:

an outer latch; and
an inner latch configured to move independently of the outer latch;
wherein the outer latch and the inner latch are configured to provide at least two latching points between the latch and the panel;
wherein the outer latch includes a base, the outer latch including a first outer latch arm extending from the base to an outer latch distal end, the first outer latch arm including a first notch to provide one of the at least two latching points between the latch and the panel;
wherein the first outer latch arm has a first tapered surface from the base to the first notch such that the thickness of the first outer latch arm increases from the base to the first notch;
wherein the first outer latch arm has a second tapered surface from the first notch to the outer latch distal end such that the thickness of the first outer latch arm decreases from the first notch to the outer latch distal end;
the outer latch including a second outer latch arm extending from the base to the outer latch distal end, the second outer latch arm including a second notch to provide one of the at least two latching points between the latch and the panel;
wherein the second outer latch arm has a third tapered surface from the base to the second notch such that the thickness of the second outer latch arm increases from the base to the second notch;
wherein the second outer latch arm has a fourth tapered surface from the second notch to the outer latch distal end such that the thickness of the second outer latch arm decreases from the second notch to the outer latch distal end.

2. The latch of claim 1 wherein the outer latch and the inner latch are configured to provide at least three latching points between the latch and the panel.

3. The latch of claim 1 wherein the outer latch is configured to provide two latching points between the latch and the panel and the inner latch is configured to provide one latching point between the latch and the panel.

4. The latch of claim 1 wherein the outer latch is configured to be deflected in a direction towards and away from the module.

5. The latch of claim 1 wherein the inner latch is configured to be deflected in a direction towards and away from the module.

6. The latch of claim 1 wherein the outer latch includes an outer press area at the outer latch distal end and the inner latch includes an inner press area at a distal end of the inner latch, the outer press area configured to deflect both the first outer latch arm and the second outer latch arm.

7. The latch of claim 6 wherein the inner press area is located within the outer press area.

8. The latch of claim 1 wherein the inner latch is joined to the module at the base, the inner latch including an inner latch arm extending from the base to an inner latch arm distal end.

9. The latch of claim 8 wherein the inner latch arm has a fifth tapered surface from the base to the inner latch arm distal end such that the thickness of the inner latch arm increases from the base to the inner latch arm distal end.

10. The latch of claim 9 wherein the inner latch includes a central arm, the central arm including a third notch to provide one of the at least two latching points between the latch and the panel.

11. The latch of claim 10 wherein the central arm includes a sixth tapered surface on a first side of the second notch and a seventh tapered surface on a second side of the third notch.

12. A latch configured to secure a module to a panel, the latch comprising:
- an outer latch; and
- an inner latch configured to move independently of the outer latch;
- wherein the outer latch and the inner latch are configured to provide at least two latching points between the latch and the panel;
- the outer latch including a first outer latch arm including a first outer latch deflection surface and a second outer latch arm including a second outer latch deflection surface;
- the inner latch including an inner latch arm positioned between the first outer latch arm and the second outer latch arm, the inner latch arm including a first inner latch deflection surface and a second inner latch deflection surface;
- further comprising a tether, the tether including a first arm and a second arm, the first arm positioned to travel over the first outer latch deflection surface and the first inner latch deflection surface and the second arm positioned to travel over the second outer latch deflection surface and the second inner latch deflection surface.

13. The latch of claim 12 wherein the first outer latch deflection surface, the second outer latch deflection surface, the first inner latch deflection surface and the second inner latch deflection surface are configured such that the first arm and a second arm of the tether deflect the inner latch and the outer latch towards the module.

14. A module comprising:
- a mounting location configured to receive one or more telecommunications connectors; and
- the latch of claim 1.

15. A latch configured to secure a module to a panel, the latch comprising:
- an outer latch; and
- an inner latch configured to move independently of the outer latch;
- wherein the outer latch and the inner latch are configured to provide at least two latching points between the latch and the panel;
- wherein the outer latch includes a base, the outer latch including a first outer latch arm extending from the base to a first outer latch distal end;
- wherein the outer latch includes a second outer latch arm extending from the base to a second outer latch distal end;
- wherein the inner latch is joined to the module at the base, the inner latch including an inner latch arm extending from the base to an inner latch arm distal end, the inner latch arm positioned between the first outer latch arm and the second outer latch arm;
- wherein the first outer latch arm, the second outer latch arm and the inner latch arm extend away from the base in the same direction.

\* \* \* \* \*